US 8,292,063 B2

United States Patent
Doan

(10) Patent No.: US 8,292,063 B2
(45) Date of Patent: Oct. 23, 2012

(54) PALLET CONVEYOR WITH CORNER ASSEMBLY

(75) Inventor: Paul George Doan, Macomb, MI (US)

(73) Assignee: Fori Automation, Inc., Shelby Township, MI (US)

( * ) Notice: Subject to any disclaimer, the term of this patent is extended or adjusted under 35 U.S.C. 154(b) by 241 days.

(21) Appl. No.: 12/773,813

(22) Filed: May 4, 2010

(65) Prior Publication Data

US 2011/0114453 A1 May 19, 2011

Related U.S. Application Data

(63) Continuation-in-part of application No. 12/036,843, filed on Feb. 25, 2008, now Pat. No. 7,708,134.

(60) Provisional application No. 60/891,527, filed on Feb. 25, 2007.

(51) Int. Cl.
B65G 13/02 (2006.01)
(52) U.S. Cl. .......................... 198/787; 198/831
(58) Field of Classification Search .................. 198/787, 198/800, 817, 831; 193/35 MD, 35 R, 37; 104/134, 135
See application file for complete search history.

(56) References Cited

U.S. PATENT DOCUMENTS

| | | | | | |
|---|---|---|---|---|---|
| 1,206,305 | A | * | 11/1916 | Cowley | 198/817 |
| 2,652,143 | A | * | 9/1953 | Van Doren | 198/840 |
| 2,729,324 | A | * | 1/1956 | Howdle | 198/416 |
| 3,026,817 | A | * | 3/1962 | Sebastian et al. | 104/135 |
| 3,507,379 | A | * | 4/1970 | Johnston | 198/787 |
| 3,620,355 | A | * | 11/1971 | Jones et al. | 198/831 |
| 3,768,416 | A | * | 10/1973 | Juechter | 104/135 |
| 3,902,588 | A | * | 9/1975 | Sato | 198/787 |
| 3,912,072 | A | * | 10/1975 | Kornylak | 198/779 |
| 4,160,500 | A | * | 7/1979 | VerMehren | 198/457.03 |
| 4,347,923 | A | * | 9/1982 | Wong | 193/35 S |
| 4,556,143 | A | * | 12/1985 | Johnson | 198/841 |
| 4,583,637 | A | * | 4/1986 | Ferguson | 198/787 |
| 4,683,707 | A | * | 8/1987 | Koyama | 53/502 |
| 4,759,434 | A | * | 7/1988 | Dorner | 198/457.02 |
| 4,930,617 | A | * | 6/1990 | Lavoie et al. | 198/692 |
| 4,958,717 | A | * | 9/1990 | Everhart | 198/416 |
| 5,000,305 | A | * | 3/1991 | Lucas | 198/414 |
| 5,029,697 | A | * | 7/1991 | McMillan et al. | 198/860.2 |
| 5,076,412 | A | * | 12/1991 | Huber | 193/35 MD |
| 5,222,585 | A | * | 6/1993 | van der Werff | 198/369.4 |
| 5,890,582 | A | * | 4/1999 | McKinnon et al. | 198/781.04 |
| 6,298,982 | B1 | * | 10/2001 | Layne et al. | 198/831 |
| 6,907,983 | B2 | * | 6/2005 | Freudelsperger et al. | 198/468.01 |

(Continued)

FOREIGN PATENT DOCUMENTS

JP  55-113319  8/1980

(Continued)

*Primary Examiner* — Douglas Hess
(74) *Attorney, Agent, or Firm* — Reising Ethington P.C.

(57) ABSTRACT

A twin strand conveyor uses roller chains to move pallets along straight conveyor sections and an unpowered corner assembly that enables the pallets to glide around corners of the conveyor. The pallets are transferred from an upstream conveyor section into the corner assembly using a corner injection unit that includes powered rollers that lift the pallets off the roller chains an onto a set of ball transfers that support the pallets as they glide through the corner assembly. A pickup unit having powered rollers draws the pallets off the ball transfers and onto the roller chains of the downstream conveyor section. Side guides are used to direct the pallets around the turn and onto the downstream conveyor section. One or more movable guides can be used in conjunction with a third or more conveyor sections to permit selective diverting of the pallets between the different conveyor sections.

24 Claims, 7 Drawing Sheets

U.S. PATENT DOCUMENTS

| | | | |
|---|---|---|---|
| 7,398,874 B2 * | 7/2008 | Deur | 198/780 |
| 7,540,375 B2 * | 6/2009 | Freudelsperger | 198/831 |
| 7,650,979 B2 * | 1/2010 | Szarkowski et al. | 193/35 MD |
| 7,708,134 B2 | 5/2010 | Doan | |
| 7,878,320 B2 * | 2/2011 | Freudelsperger | 198/597 |

FOREIGN PATENT DOCUMENTS

| | | |
|---|---|---|
| JP | 09-066940 | 3/1997 |
| JP | 2000-255760 | 9/2000 |
| JP | 2001-192116 | 7/2001 |
| JP | 2002-046856 | 2/2002 |

* cited by examiner

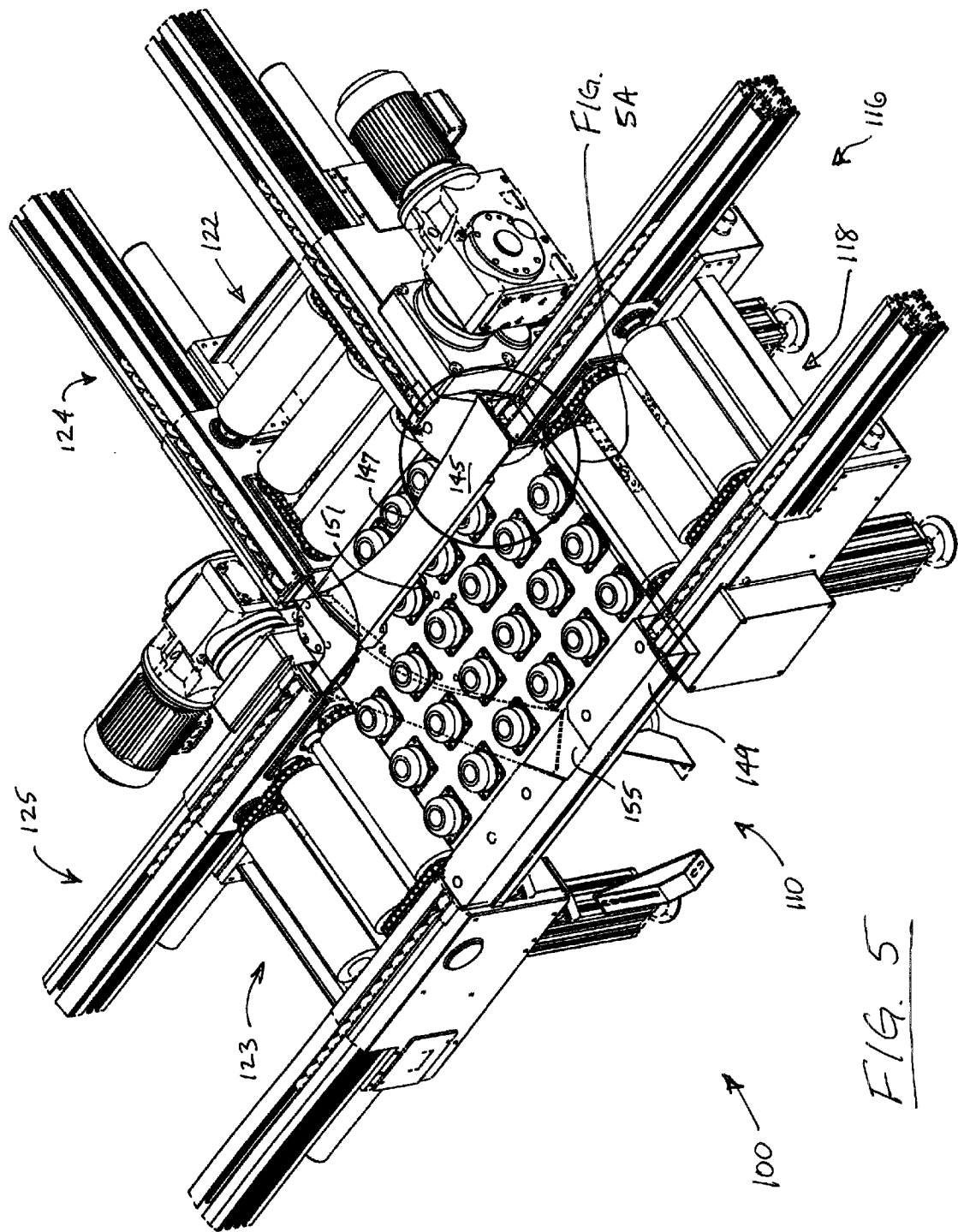

PALLET CONVEYOR WITH CORNER ASSEMBLY

CROSS-REFERENCE TO RELATED APPLICATIONS

This application is a continuation-in-part of U.S. Ser. No. 12/036,843, filed Feb. 25, 2008, now U.S. Pat. No. 7,708,134, which claims the priority of U.S. Provisional Application No. 60/891,527, filed Feb. 25, 2007. The entire contents of these prior applications are hereby incorporated by reference.

TECHNICAL FIELD

This invention relates generally to pallet conveyors and, more particularly, to twin strand chain conveyors with corner assemblies for transporting pallets through turns.

BACKGROUND OF THE INVENTION

Conveyors are commonly used to transport objects such as automotive components on pallets along paths in an assembly or manufacturing plant. One type is a twin strand conveyor which is desirable in certain applications because of its relative low cost and low noise. This conveyor type works well along straight runs, but may encounter challenges at corners and other turns and because, by its design, it needs a secondary means of changing direction, as it is only designed to convey objects in a straight line. One solution is a lift and transfer system where pallets are lifted off one straight section and conveyed in another direction by a second conveyance device with a different power source.

SUMMARY OF THE INVENTION

In accordance with one aspect of the invention, there is provided a conveyor for pallets which includes a chain conveyor having first and second chain conveyor sections and a corner assembly that joins said first and second conveyor sections together. The first conveyor section has a corner injection unit comprising a powered drive that engages the pallets and drives the pallets into the corner assembly. The corner assembly has a plurality of ball transfers forming an unpowered gliding support for the pallets, and has at least one guide that directs the pallets through the corner assembly. The second conveyor section has a pickup unit comprising a powered drive that engages the pallets and pulls the pallets from the corner assembly.

In accordance with another aspect of the invention, there is provided a pallet conveyor that includes a plurality of pallets, a powered chain conveyor section, and a corner assembly connected at an end of the conveyor section to receive pallets exiting the conveyor section. The pallets have an upper platform and one or more lower support surfaces. The power chain conveyor includes a pair of chains running along opposite sides of the conveyor section such that a pallet can be placed on the conveyor section with each pallet resting upon the pair of chains. The chain conveyor includes at least one motor operatively connected to the chains to drive the chains along the conveyor section. The corner assembly has at least one guide defining a curved path and a low friction gliding support for the pallets as they move through the corner assembly. When a pallet is transferred from the conveyor section to the corner assembly, support for each pallet is transferred from the chains to the gliding support with each pallet moving through the corner assembly on the gliding support along a path defined by the one or more guides. A corner injection unit is located at a downstream end of the conveyor section adjacent the gliding support. The corner injection unit comprises a powered drive that engages the pallets as they exit the conveyor section and drives them onto the gliding support.

BRIEF DESCRIPTION OF THE DRAWINGS

Preferred exemplary embodiments of the invention will hereinafter be described in conjunction with the appended drawings, wherein like designations denote like elements, and wherein:

FIG. 5 is a partial perspective view of a second embodiment of a conveyor constructed in accordance with the invention and showing a corner assembly having a movable diverter arm;

DETAILED DESCRIPTION OF THE PREFERRED EMBODIMENTS

Figure 1:
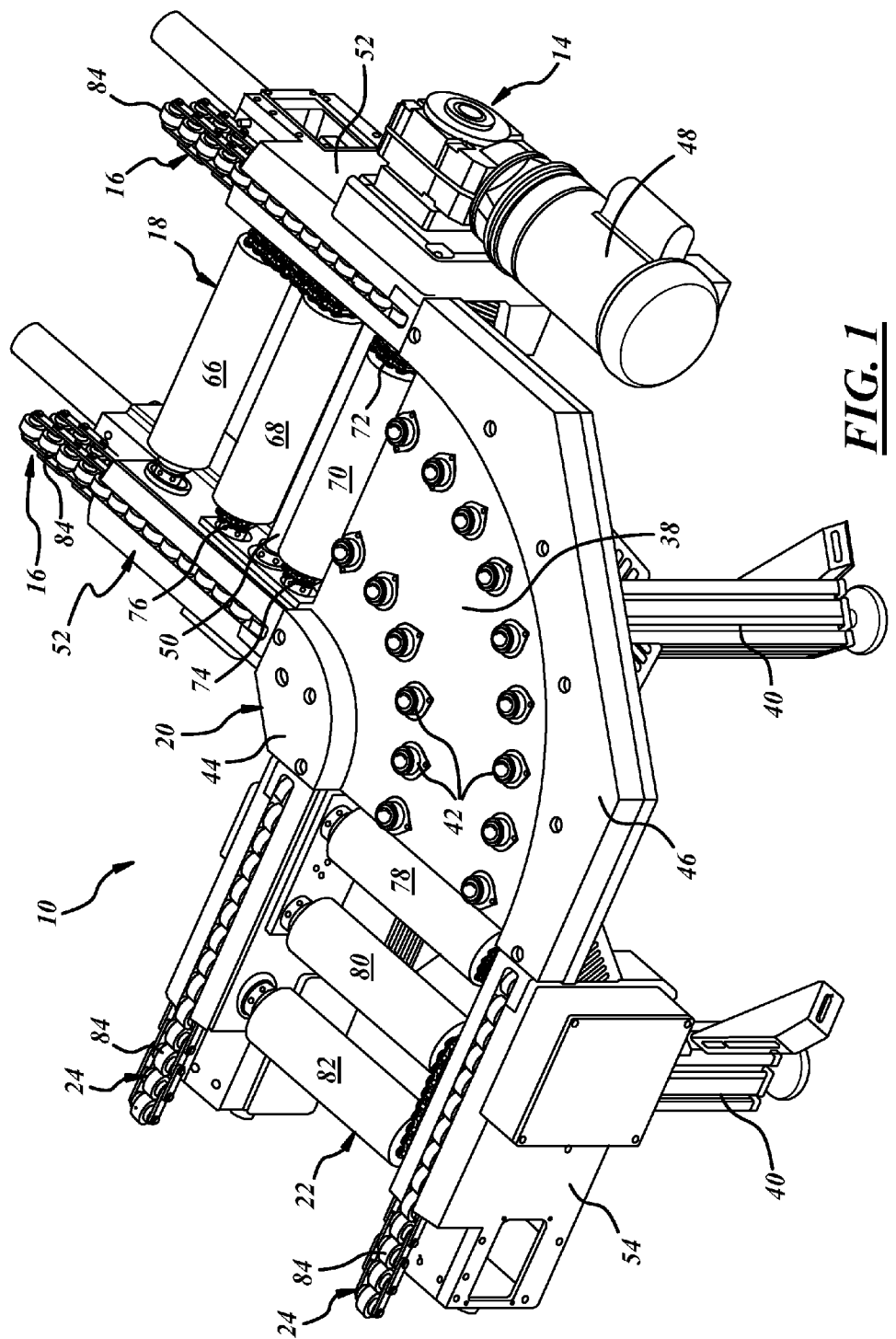
FIG. 1 is a partial perspective view of a first embodiment of a conveyor constructed in accordance with the invention and showing a corner assembly for moving pallets through a turn.

Referring now to the drawings, FIGS. 1-4 show one embodiment of a power conveyor and its corner assembly 10. The power conveyor is a twin strand conveyor that continuously moves a pallet 12 around a corner from one conveyor straight section to another straight section using only power derived from the twin strand chain motor drives of the two straight sections. In particular, the conveyor uses a drive assembly 14 to power a first twin strand conveyor section 16 that drives the pallet 12 into the corner assembly 10 using a power roller corner injection unit 18. The corner assembly 10 itself is unpowered, but provides a low friction gliding support and side guide that allows the pallet to move easily through the corner assembly and to a power roller pickup unit 22 which forms the starting end of a second twin strand conveyor section 24. Both the corner injection unit 18 and the pallet pickup unit 22 derive their motive power from the motorized drive assemblies that are used on their respective conveyor sections to drive the twin strand chains. In this way, the pallets can be powered through corners without requiring the corner assemblies themselves to provide powered driving of the pallets and without requiring a separate power drive to be added to the conveyor. This also permits the pallets to be conveyed around the corner with substantially uninterrupted movement.

Figure 2:
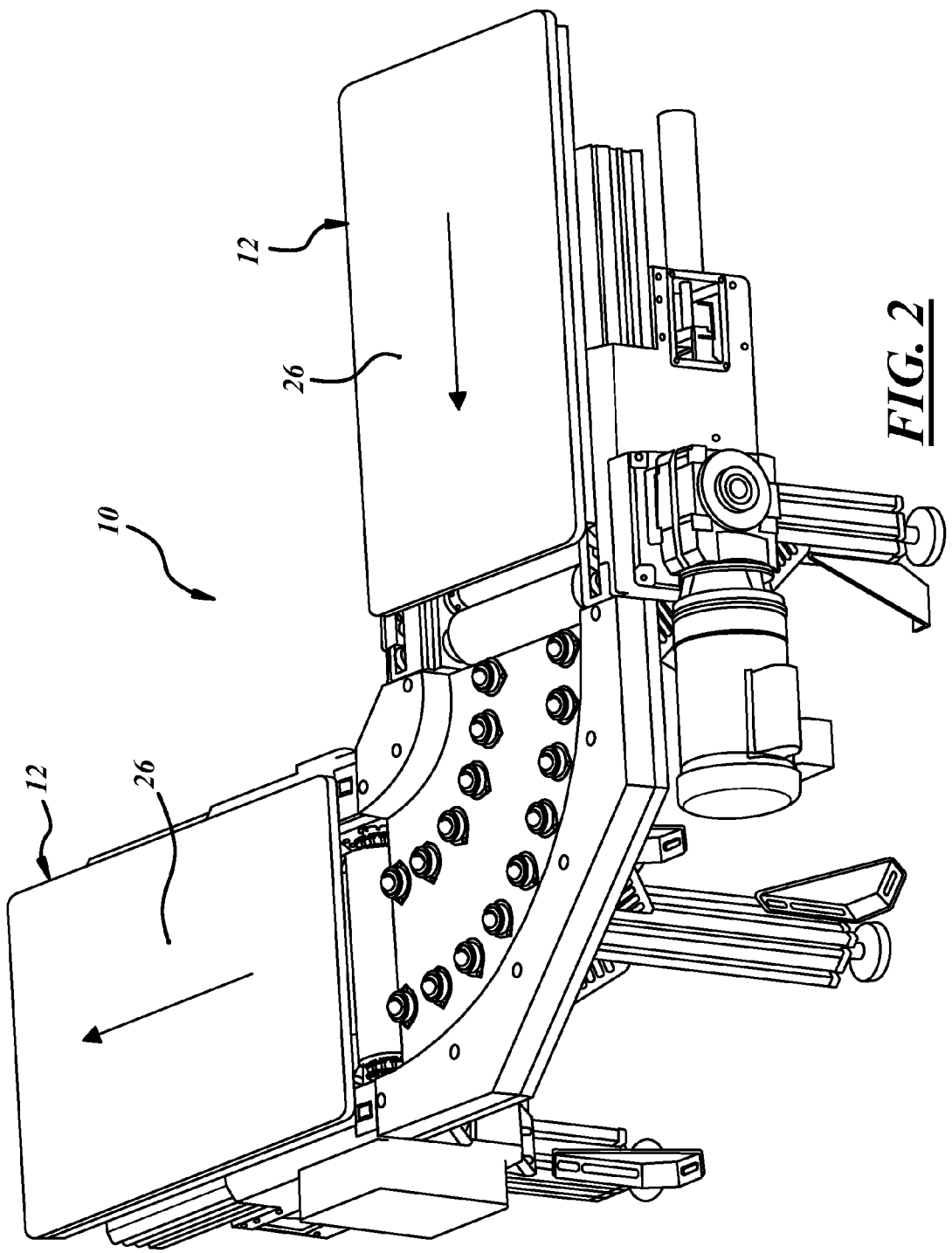
FIG. 2 is another perspective view of the conveyor of FIG. 1 showing a pair of pallets traveling thereon.
Figure 3:
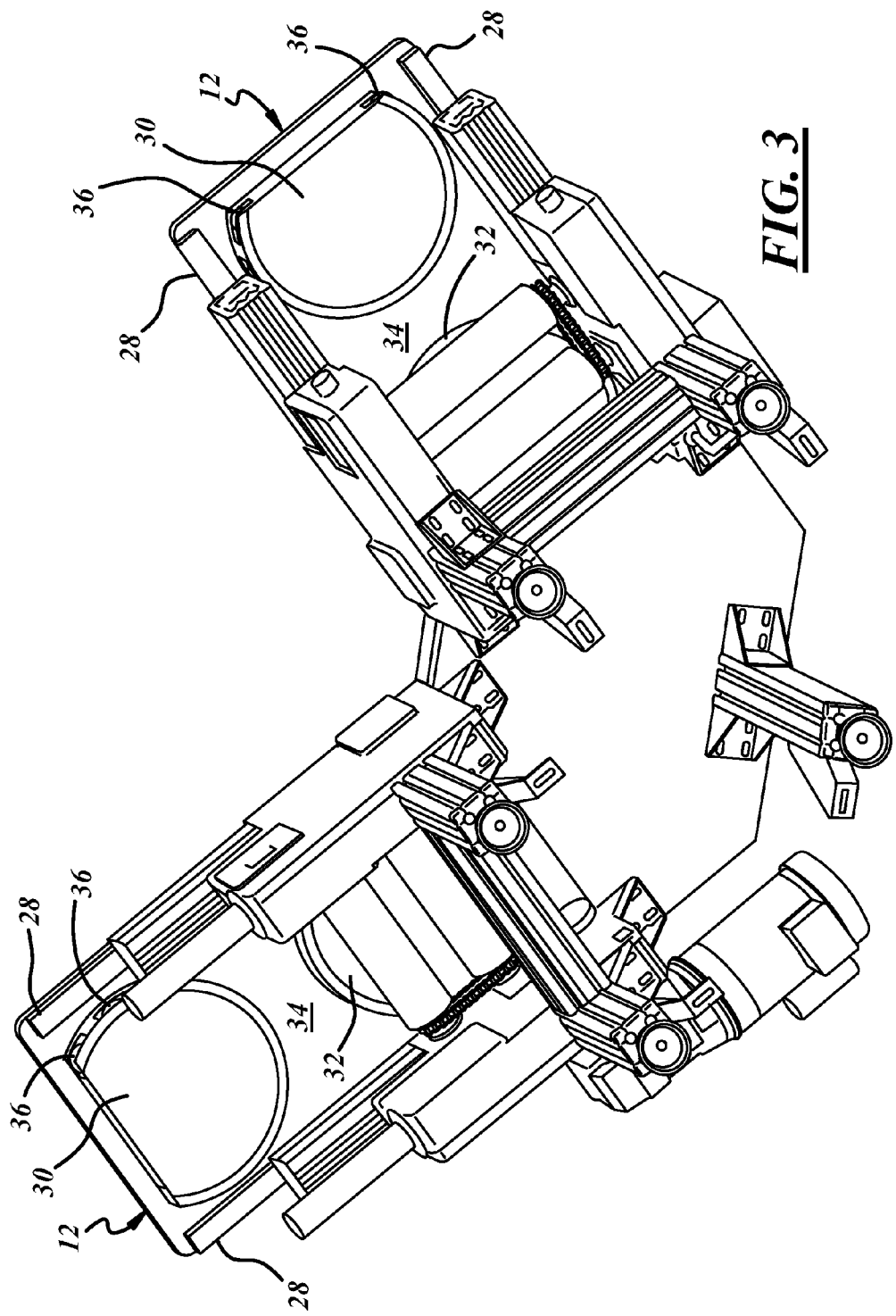
FIG. 3 is a bottom perspective view of the conveyor of FIG. 1 showing a bottom surface of the pair of pallets.

Referring to FIGS. 2 and 3, the pallet 12 itself will now be described. While the illustrated pallet is suited for the corner assembly 10, other pallets can be used with the corner assembly 10; and likewise the pallet 12 can be used with other corner assemblies. The pallet 12 can be made out of a rigid material such as steel and, as shown, is constructed to carry objects that weigh as much as 1360 kg around the corner assembly 10. The pallet and conveyor can be sized and constructed to handle other payloads weighing more or less than this using materials and techniques known to those skilled in the art. Each pallet 12 includes an upper rectangular platform 26 where the carried object is placed. A pair of shoulders 28 are mounted on the bottom surface of the platform 26. The shoulders 28 are positioned along opposite lateral sides of the platform 26 to ride on each side of the particular twin strand conveyor. A pair of pucks 30, 32 are mounted at opposite ends of the bottom surface of the platform 26. The shoulders 28 are used to convey the pallet through the straight conveyor sections using the twin strand chain drives, whereas the pucks 30, 32 are used not only by powered rollers of the corner injection unit 18 and pickup unit 22, but also by the low friction glide support (described below) of the corner assembly 10. Each puck has a truncated disc shape and extends down from the bottom surface of platform 26 farther than the shoulders 28 to form an underside 35 of the pallet. Each puck is separated from the other by a space 34 which, along with the disc shape of the pucks, help the pallet 12 navigate around the corner assembly 10 without jamming or otherwise being interrupted. Each puck 30, 32 may also include a plurality of rollers 36 that are rotatably mounted along and extend beyond a circumferential periphery of the respective puck. The rollers 36 rotate freely and are used to provide a rolling surface that engages side guides 44, 46 on the corner assembly to provide a very low friction contact between the pallet and the guides as it turns the corner.

Referring to FIG. 1, the corner assembly 10 includes a frame 20 which defines the turn that connects one conveyor straight section with another. In this case, the corner frame 20 defines a 90° turn between the first twin strand conveyor section 16 and the second twin strand conveyor section 24. The corner frame 20 includes a base 38 that is supported by several legs 40. A plurality of ball transfers 42 are lined along a top surface of the base 38. Skilled artisans will generally know of different types of suitable ball transfers including the illustrated flange-mounted type. This type includes a steel ball cup that holds a partially exposed nylon or steel ball therein. Ball bearings are sealed in the cup and allow the ball to spin freely, and a pair of flanges extends away from the cup to bolt the ball transfers 42 to the base 38. The pallet 12, specifically the pucks 30 and 32, ride over the ball transfers 42 as the pallet travels around the turn. Such ball transfers are passive in the sense that they do not provide propulsion to the pallets and instead simply provide a low friction gliding support. The corner frame 20 further includes an inner guide 44 and an outer guide 46 that together steer the pallet 12 around the turn. Each guide has a continuously curved inner surface that can be made of or lined with a low friction plastic such as Delrin™, available from Dupont, a UHMW (ultra-high-molecular-weight) plastic, or the like. Depending upon the application, the conveyor and/or pallets can be equipped with either the rollers 36, the low friction material on the inner surface of the guides, or both. For example, where rollers 36 are used, they can be mounted on the pallets as shown, or instead can be mounted on one or both guides 44, 46 of the corner assembly 10. In other embodiments, instead of using the low friction material as shown on one or both of the guides 44, 46, it can instead by provided on the corresponding side surface of the pallets. Furthermore, for some applications, no rollers or special low friction material on either the guides or pallet may be needed; rather, metal-on-metal contact of the pallet and guides may work suitably for a particular application. The height of the gliding support plane defined by the ball transfers is selected relative to the height of the guides 44, 46 and in conjunction with the design of the pallet 12 such that the pucks 30, 32 ride on the ball transfers while the shoulders 28 are spaced upwardly slightly above the guides so as not to frictionally engage those guides. Thus, where the pucks extend downwardly from the platform 26 farther than the shoulders, the plane of the ball transfers (i.e., the plane of the low friction gliding support) can be below the plane of the top surface of the guides, and the height of the pucks will keep the shoulders out of contact with the guides. Alternatively, where the pucks and shoulders have the same height, each guide can comprise an upwardly extending guide that fits in the space between its associated shoulder and the pucks. Various other implementations will become apparent to those skilled in the art.

Other suitable implementations of the corner assembly are possible and will be apparent to those skilled in the art. For example, the pallets could be supported through the corner assembly by ball transfers 42 located on the guides in line with the twin strands. In this way, the pallet can be supported by its shoulders through the turn either instead of or in addition to using the pucks and their centrally-located ball transfers. Moreover, in lieu of the ball transfers 42 and guides 44, 46, other suitable passive low friction means of transferring the pallet between injection unit 18 and pickup unit 22 while guiding the pallet around the turn can be used and, depending upon the particular transferring means used, the design of the pallet can be changed accordingly.

With regard to the twin strand conveyor sections, their construction and operation is generally known to those skilled in the art. See, for example, U.S. Pat. No. 4,339,030 and references citing that patent. In short, the first and second twin strand conveyor sections 16 and 24 convey the pallet 12 by its shoulders 28 along generally straight conveyor sections. Each twin strand conveyor section has an endless roller chain 84 that is driven along an extruded metal track defining an upper drag path looped around to a lower return path. The roller chain 84 has a series of revolving rollers that move the pallet at a speed which is in excess of the chain's linear speed, such as is shown and described in the aforementioned U.S. Pat. No. 4,339,030.

As mentioned above, a single drive assembly can power both the twin strand conveyor sections and their terminal injection and pickup units. With reference to FIG. 1, the drive assembly 14 powers the upstream twin strand conveyor section 16 along with its power roller corner injection unit 18. As shown, the drive assembly 14 includes an electric motor 48, suitable ones of which will be known to those skilled in the art. Further, it will be appreciated that different size electric motors will suit different applications, and that the particular motor selected for an application can depend on, among other things, the desired speed and load on the conveyor. One example is an 1,800 rpm motor that can produce a pallet speed of 12 in/sec through suitable speed reduction gearing. Although only one electric motor is shown, two or more can be used for increased speed and heavier loads. As shown, the electric motor 48 continuously rotates a drive shaft 50 that extends across the width of the twin strand conveyor section 16 and is located at the injection unit 18. The drive shaft 50, in turn, transmits rotation and motion (either directly or indirectly) to the first twin strand conveyor section 16 and the corner injection unit 18. More specifically, the drive shaft 50 extends across the conveyor section 16 at its downstream end between two sprocket housings 52. In each housing 52, one or more drive sprockets (not shown) fixed to the drive shaft 50 are used to drive the twin strand chains 84 of the conveyor section 16 either directly or via other gearing or chain/sprocket linkages, and any of these approaches can be implemented in a manner known to those skilled in the art. A tensioner is also located in each sprocket housing 52 to keep each chain 84 taut throughout its length. Skilled artisans will know that several types of tensioners are suitable including the spring-loaded type.

The corner injection unit 18 comprises a plurality of rollers 66, 68, 70 driven by motor 48 via shaft 50 through a suitable transmission such as a sprocket and chain arrangement at or within the sprocket housing 52. The rollers can be steel or other suitable material selected in conjunction with the lower surface material of the pucks 30, 32 such that a suitable frictional engagement of the rollers and pucks exist to drive the pallet into the corner assembly 10. Also, as shown in FIG. 3, the circumferential edges of the pucks can be beveled to assist in them engaging and riding up on the rollers 66-70. The corner injection unit 18 takes the pallet 12 off the first twin strand conveyor section 16 by raising the pallet slightly above the twin strand conveyor as the pallet is drawn onto the corner injection unit 18. The rollers 66-70 are all rotated in the same direction at a speed selected such that the speed of the pallet is the same when driven by the chains 84 or rollers 66-70. In other embodiments, there can be more or less individual rollers of varying sizes and each can be run at whatever speed is desired.

Each of the rollers is indirectly powered by the drive shaft 50 using various chains that are slaved off of the drive shaft, but one or more of the rollers could be passive (unpowered). In the illustrated embodiment, the drive shaft 50 includes a fixed sprocket (not shown) positioned in a power takeoff box that is located just outside the housing 52 where the drive shaft extends from the motor/reduction gearset, through the power takeoff box, through housing 52 and across the conveyor to the other housing 52. Within the power takeoff box, this first sprocket can be connected by a chain to a second sprocket on an injection unit drive shaft with a 3:1 ratio used to speed up the injection unit drive shaft to the speed needed for rollers 66-70. This injection unit drive shaft can extend from the power takeoff box, through the housing 52, to a location under drive shaft 50 where it holds a third sprocket with a first chain 72 extending between the third sprocket and a fourth sprocket fixed to a shaft of the roller 70. Furthermore, a fifth sprocket 74 is fixed to the shaft of the roller 70 at the roller's other end. A second chain engages the fifth sprocket 74 and also engages an idler fixed below the drive shaft 50. A third chain engages the idler and also engages a sixth sprocket 76 that is fixed to a shaft of the roller 68. Finally, a seventh sprocket is fixed to the shaft of the second roller 68 at the roller's other end, and a fourth chain engages the seventh sprocket and an eighth sprocket that is fixed to a shaft of the roller 66. The gear ratios of the third through eighth sprockets can be 1:1 so that they all run at the same speed set originally by the ratio between the first and second sprockets.

Figure 4:
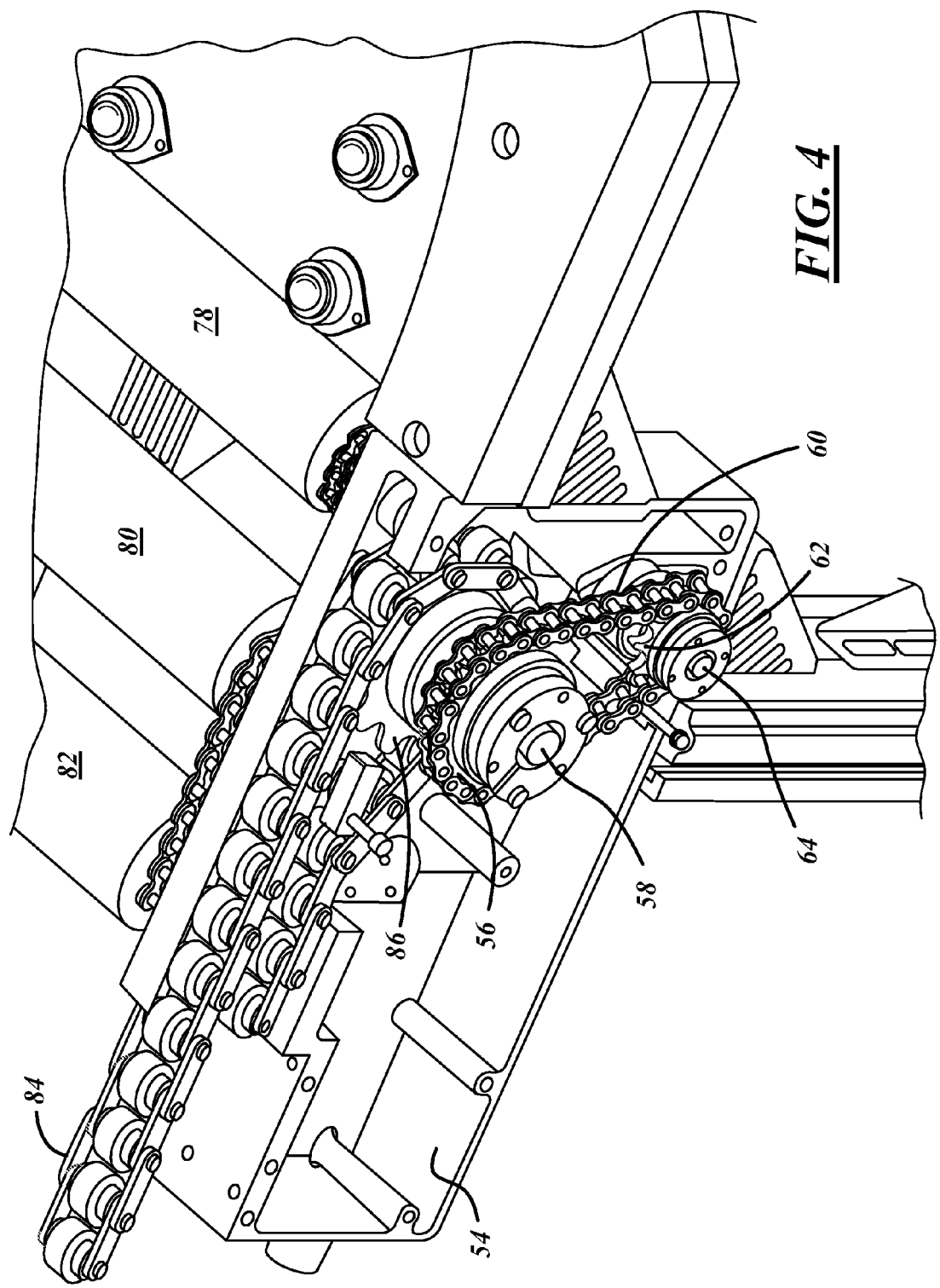
FIG. 4 is a close-up view of a sprocket housing and power takeoff box of the conveyor of FIG. 1.

Before the pallet 12 is propelled completely off the corner injection unit 18, a leading portion of the puck 30 slides over the ball transfers 42 and catches the first roller of the pickup unit 22. The pickup unit 22 subsequently draws the pallet 12 through the remainder of the corner turn and onto the downstream twin strand conveyor section 24. The pickup unit 22 also includes three steel rollers 78, 80, and 82 similar to those described for the injection unit 18. These rollers hold the pallet slightly above the twin chains 84 of the second conveyor section 24 until the pallet moves off the pickup rollers and onto the chains. To power the chains 84 of the second conveyor section 24 and the rollers 78-82 of its pickup unit 22, the second conveyor section 24 also has an electric drive motor (not shown) which is located at the downstream end of that conveyor section. The second conveyor section 24 can be powered by its motor in the same manner shown for the first conveyor section 16. As shown in FIG. 4, power is provided to the pallet pickup unit 22 by way of one of the driven twin strand chains 84 via a sprocket and chain set that powers the rollers 78-82 of the pickup unit 22 at a desired speed. This set of sprockets and chains are driven from a return sprocket shown at 86 which engages and is driven by the chain 84. The chain 84 and sprocket 86 are located within a sprocket housing 54, and a second such housing is also provided over the chain and return sprocket at the other lateral side of conveyor section 24. The sprocket 86 is mounted on a shaft 58 which extends outwardly from the housing 54 into a power takeoff box (shown in FIG. 1). The covers of the power takeoff box and housing 54 are shown removed in FIG. 4 for illustrative purposes. The sprocket and chain drive of the rollers 78-82 can be the same as that described above for the corner injection unit 18, wherein the shaft 58 includes a second sprocket 56 connected by chain 60 to a third sprocket 62 mounted on a second shaft 64 inside the power takeoff box. This shaft extends out of the power takeoff box, through the housing 54 and to a location underneath roller 78 where it is connected to that roller and the others by a series of chains and sprockets, as discussed above in connection with the injection unit 18.

As mentioned, the injection unit 18 and pickup unit 22 can each be of the roller assembly type as shown. In other embodiments though, they may be of the belt assembly type, or other types that provide enough friction and power to propel the pallets 12 around the corner assembly 10. Of course, in the belt assembly type, those skilled in the art will appreciate that the exact construction and operation of the drive assembly 14 will differ, including for example the various shaft, sprocket, and chain arrangements. Indeed, these arrangements may not be needed at all in the belt assembly type.

Turning now to FIG. 5, there is shown a second embodiment of a power conveyor 100 and its corner assembly 110. The conveyor 100 of this embodiment can constructed as described above in connection with FIGS. 1-4, and differs primarily in that it includes a third conveyor section and a movable guide in the form of a single diverter arm. In particular, the corner assembly 110 comprises a diverter that operates to selectively permit movement of pallets 12 either straight through the diverter 110 between a first pair of the conveyor sections or through a ninety degree turn between a different pair of conveyor sections. These conveyor sections include a first conveyor section 116, a second conveyor section 124, and a third conveyor section 125. The diverter arm 145 is mounted at the juncture of the second and third conveyor sections such that it pivots about a vertical axis at the juncture. The diverter arm moves between a first, pallet-diverting position and a second, straight feed-through position. In FIG. 5, the diverter arm 145 is shown in its second position such that the pallets 12 move straight through the corner assembly 110 from the first conveyor section 116 to the third conveyor section 125. When in the first position, shown in phantom, pallets entering the corner assembly 110 from the first conveyor section 116 are diverted by the arm 145 onto the second conveyor section 124. Activation of the diverter arm to switch it between positions can be done using a motor or linear actuator (not shown) mounted underneath the conveyor 100 and connected to the diverter arm 145 via a vertical shaft or other gearing or linkage (not shown). Other suitable mechanisms can be used. Control of the actuator can be done using any of a number of known techniques, such as using a PLC that runs suitable programming based on pallet sensors and/or information concerning the workpiece(s) carried by the pallets.

The diverter arm 145 acts as a movable guide that, when in the first position, functions much as the fixed (non-movable) outer guide 46 of the first embodiment. That is, as the pallets 12 move through the corner assembly 110, the rollers 36 or other side portions of the lower pucks 30, 32 of the pallets 12 (FIG. 3) contact a curved side 147 of the diverter arm which steers the pallet around the turn from the first conveyor section 116 to the second conveyor section 124. This curved side 147 does not form a full ninety degree bend, as does the guide 46 of the first embodiment. Rather, when the diverter arm 145 is in its first position, it contacts a fixed, straight guide 149 extending from the first conveyor section 116 to the third conveyor section 125 at a side of the corner assembly opposite the second conveyor section 124. As a result, a two-part, yet complete outer guide is formed from a portion of this fixed guide 149 together with the curved side 147 of the diverter arm 145, and this complete guide directs the pallets 12 along an at least partially curved path through the corner assembly 110. The other longitudinal side 151 of the diverter arm 145 that is opposite the curved side 147 is straight, not curved, such that when the diverter arm is in the second position, the fixed guide 149 and this straight side 151 of the diverter arm together form a pair of spaced guides that directs or constrains the pallets 12 along a straight path through the corner assembly from the first conveyor section 116 to the third conveyor section 125.

The conveyor 100 can be operated in various modes, for example, to divert incoming pallets between one of two possible outgoing paths. For this, the first conveyor section 116 can have a corner injection unit 118 that drives pallets from conveyor section 116 into the corner assembly, whereas the second and third conveyor sections can have pickup units 122 and 123, respectively. Or, conveyor 100 can be used to combine incoming pallets from two paths into a single outgoing path. For this, the second and third conveyor sections 124 and 125 can include corner injection units, whereas the first conveyor section 116 can have a pickup unit. Furthermore, the twin strand chain drives and corner injection/pickup units can be made reversible under program control so that they can move the pallets in either direction, in which case the units identified by numerals 118, 122, and 123 can operate as either a corner injection unit or a pickup unit depending on the direction in which their rollers are operated.

Figure 5A:
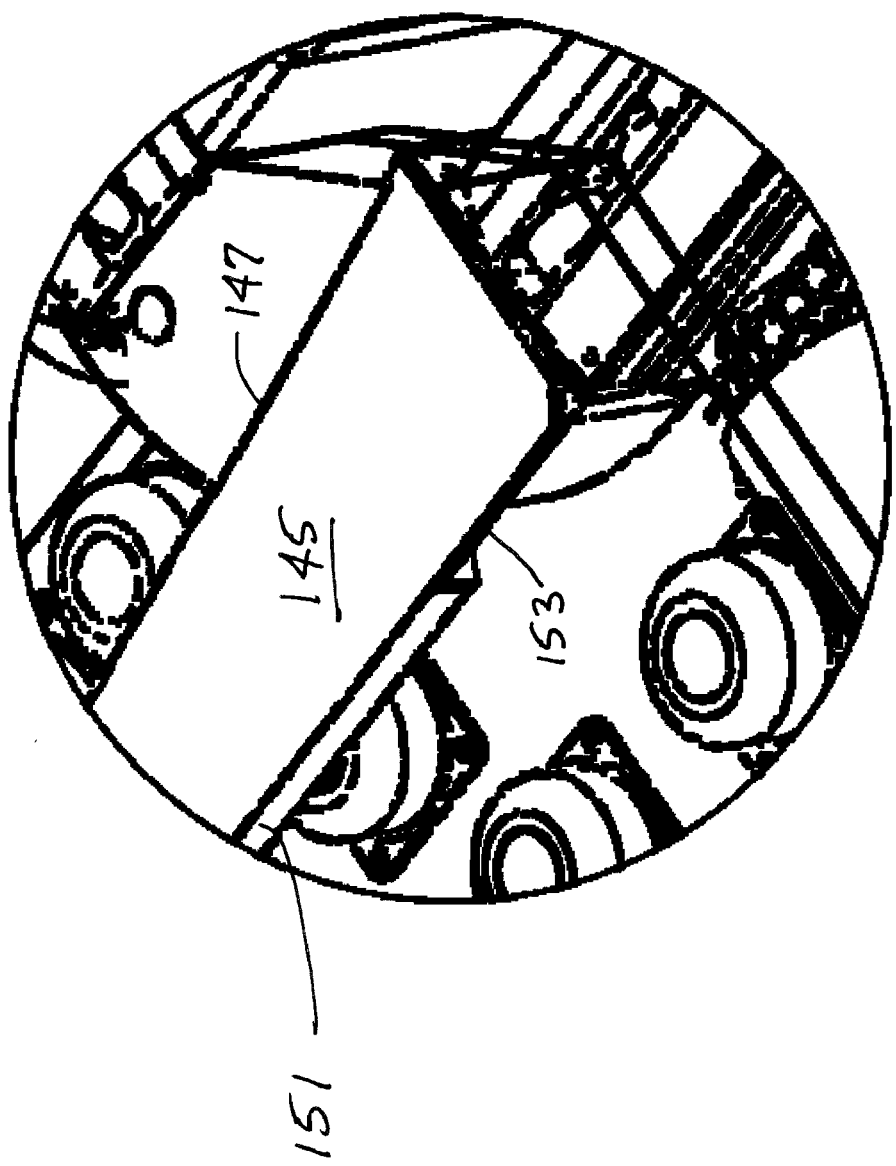
FIG. 5A is an enlarged, fragmentary view of the distal end of the diverter arm shown in FIG. 5.

Further details of the diverter arm 145 is shown in FIGS. 5 and 5A. The diverter arm extends from a proximal end where the diverter arm is pivotally mounted, to a distal, free end that swings an arc about said axis as the arm moves between the first and second positions. The limits of travel can be implemented mechanically, for example, based on the limits of movement of the actuator used to move the arm or by physical engagement of the arm at those limits, or can be implemented electronically, such as by using limit or proximity switches. In the embodiment shown in FIGS. 5 and 5A, the diverter arm 145 and the fixed guide 149 each have a stop feature that can be used together to limit the travel of the diverter arm when moving to the first position. The stop feature contained on the diverter arm 145 comprises a rabbet 153 formed at the distal, free end of the arm, whereas the stop feature on the fixed guide 149 comprises a notch 155 that receives the rabbeted portion 153 of the diverter arm when it is in the first position. While actuator limits and limit switches and other such means of limiting the swing of diverter arm 145 can be used as a primary means of limiting movement when switching to the first position, the rabbeted portion 153 presents a side surface that can engage the fixed guide 149 at the notch, and the straight side 151 of the diverter arm 145 at the distal end can engage the edge of the notch 155 such that one or both of these engagements provides a hard stop that prevents over rotation of the arm 145. A fixed hard stop can also be provided adjacent the second position so that the curved side 149 of the diverter arm near its distal end can engage this hard stop and prevent over rotation when moving to the second position.

Figure 6:
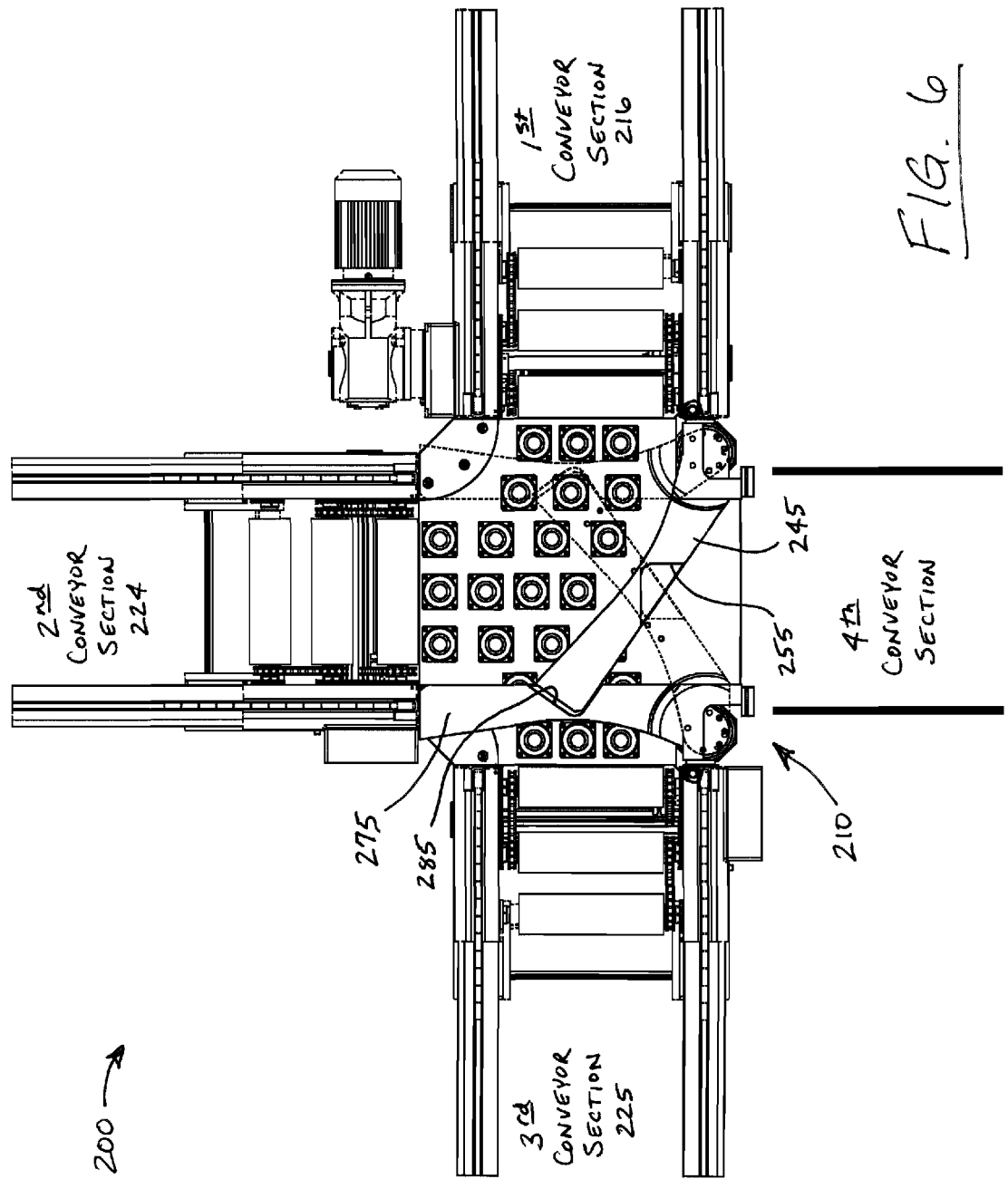
FIG. 6, is a partial top view of a third embodiment of a conveyor constructed in accordance with the invention and showing a corner assembly having two movable diverter arms.

FIG. 6 depicts a conveyor 200 constructed in accordance with a third embodiment.

The details of construction discussed above in connection with the first two embodiments apply equally here. In this embodiment, a pair of diverter arms 245, 275 are used to control transference of pallets 12 through the corner assembly 210. Rather than mounting the first diverter arm 245 at the juncture of the second and third conveyor sections 224, 225, as was done in for conveyor 100, this first arm 245 is mounted at the opposite corner; that is, adjacent the first conveyor section 216 at a location opposite the second conveyor section 224. Similarly, the second diverter arm 275 is mounted adjacent the third conveyor section 225 at a location opposite the second conveyor section 224. In FIG. 6, the first diverter arm 245 is shown in its first position, whereas the second diverter arm 275 is shown in its second position such that pallets can be transferred between the first conveyor section 216 and the second conveyor section 224, and it will be appreciated that by reversing the drives for these two conveyor systems, the pallets can be moved through the corner assembly 210 in either direction. The diverter arms are also shown in phantom in their opposite positioning; that is, with the first diverter arm 245 in its second position and the second diverter arm 275 in its first position. In this arrangement, pallets can be transferred between the second conveyor section 224 and the third conveyor section 225. This transference can be in either direction and can be reversible if desired.

The diverter arms of this embodiment each have a pair of stop features that together can be used to limit travel of the arms when moving to their first position. In particular, each diverter arm 245, 275 is constructed in the same manner as diverter arm 145 discussed above, by including a rabbeted portion at its distal, free end, but then also includes a notch 255, 285, respectively, which can be implemented in the same manner as the notch 155 of the fixed guide 149. Each notch 255, 285 extends into a middle region of its respective diverter arm on the straight side of the arm. When one arm is in its first position and the other in its second position, the curved side of the one arm and the straight side of the other arm together form a complete guide that directs the pallets along an at least partially curved path through the corner assembly 210 from one of the conveyor sections to another of the conveyor sections.

Further embodiments are possible, as will become apparent to those skilled in the art. For example, as shown diagrammatically in FIG. 6, a fourth conveyor section 227 can be added that permits pallets to flow through the corner assembly 210 between the second and fourth conveyor sections. For this, both the diverter arms are moved to their second positions. Thus, for a four-way corner assembly, the two diverter arms can be positioned into any of three combinations of their respective first and second positions to control transference of the pallets between the four different conveyor sections.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, for the pallets, the shoulders 28 need not be separate components mounted to the bottom surface of platform 26, but instead can comprise a unitary part of the platform 26 or other portion of the pallet. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A conveyor for pallets, comprising:
   a chain conveyor having first and second chain conveyor sections and a corner assembly that joins said first and second conveyor sections together;
   said first conveyor section having a corner injection unit comprising a powered drive that engages the pallets and drives the pallets into said corner assembly;
   said corner assembly having a plurality of ball transfers forming an unpowered gliding support for the pallets as they move through said corner assembly, wherein said corner assembly further includes at least one guide that directs the pallets through the corner assembly;
   said second conveyor section having a pickup unit comprising a powered drive that engages the pallets and pulls the pallets from said corner assembly.

2. A conveyor as defined in claim 1, wherein said corner injection unit, said pickup unit, or both, each comprise a plurality of powered rollers.

3. A conveyor as defined in claim 1, further comprising a plurality of pallets each having a pair of spaced shoulders, wherein each of said conveyor sections include a pair of spaced drive chains and wherein said spaced shoulders each engage one of said spaced drive chains such that said drive chains together support and move said pallets along that conveyor section.

4. A conveyor as defined in claim 3, wherein each of said pallets has an underside that engages the ball transfers.

5. A conveyor as defined in claim 3, wherein the first conveyor section includes a pair of spaced chains that move the pallets along a straight section of the conveyor, and wherein the powered drive of the corner injection unit operates to lift the pallets off the chains.

6. A conveyor as defined in claim 3, wherein each pallet driven into the corner assembly by the corner injection unit engages the pickup unit prior to fully exiting the injection unit.

7. A conveyor as defined in claim 1, wherein said at least one guide comprises a fixed outer guide that steers the pallets along a curved path through said corner assembly.

8. A conveyor as defined in claim 1, wherein said chain conveyor includes a third conveyor section joined to said first and second conveyor sections by said corner assembly, wherein said corner assembly comprises a diverter and wherein said at least one guide comprises a diverter arm movable between a first position in which the pallets move between a first pair of said conveyor sections and a second position in which the pallets move between a second pair of said conveyor sections.

9. A conveyor as defined in claim 8, wherein said first pair of conveyor sections is formed from said first and second conveyor sections and said second pair of conveyor sections is formed from said first and third conveyor sections, wherein when said diverter arm is in said first position, the pallets move from said first conveyor section to said second conveyor unit and when said diverter arm is in said second position, the pallets move from said first conveyor section to said third conveyor section.

10. A conveyor as defined in claim 8, wherein said third conveyor section includes a powered drive that is reversible, such that said powered drive of said third conveyor section can be used as either an injection unit or a pickup unit.

11. A conveyor as defined in claim 8, wherein said diverter arm comprises a first diverter arm and wherein said corner assembly further comprises a second diverter arm movable between a first position and a second position, said first and second diverter arms each being movable between their respective first and second positions to control transference of the pallets between said conveyor sections.

12. A conveyor as defined in claim 11, wherein said chain conveyor includes a fourth conveyor section joined to said first, second, and third conveyor sections by said corner assembly, wherein said first and second diverter arms together are positionable in any of three combinations of their respective first and second positions to control transference of the pallets between said conveyor sections.

13. A conveyor as defined in claim 11, wherein, when said first and second diverter arms are placed into at least one combination of their respective first and second positions, said diverter arms together form a complete guide that directs the pallets along an at least partially curved path through said corner assembly from one of said conveyor sections to another of said conveyor sections.

14. A conveyor as defined in claim 11, wherein each of said diverter arms includes a proximal end mounted for pivotal rotation of that diverter arm about an axis, and a distal, free end that pivots about said axis when moving between said first and second positions, and wherein at least one of said diverter arms includes a stop feature that engages the other diverter arm when moving between said first and second positions.

15. A conveyor as defined in claim 14, wherein said stop feature comprises a notch located between said proximal and distal ends that receives at least a portion of said distal, free end of said other diverter arm.

16. A conveyor as defined in claim 14, wherein said stop feature comprises a rabbet in said distal, free end that presents a side edge that engages said other diverter arm.

17. A conveyor as defined in claim 14, wherein each of said diverter arms includes a stop feature, wherein said stop feature of said first diverter arm comprises a rabbet in said distal, free end and said stop feature of said second diverter arm comprises a notch that receives said rabbeted portion of said first diverter arm when said first diverter arm is in its first position and said second diverter arm is in its second position.

18. A conveyor as defined in claim 17, wherein each of said diverter arms includes said rabbet and said notch.

19. A conveyor as defined in claim 8, wherein said corner assembly has a single said diverter arm and a second, fixed guide and wherein said diverter arm includes a first, curved side and a second, straight side, wherein, when in said first position, said curved side and said fixed guide together form a complete guide that directs the pallets along an at least partially curved path through the corner assembly between the first and second conveyor sections, and when in said second position, said straight side and said fixed guide together form a pair of spaced guides that directs the pallets along a straight path through the corner assembly between the first and third conveyor sections.

20. A conveyor as defined in claim 19, wherein said diverter arm includes a proximal end mounted for pivotal rotation of said diverter arm about an axis, and a distal, free end that pivots about said axis when moving between said first and second positions, said distal, free end having a rabbeted portion and said fixed guide having a notch that receives said rabbeted portion when said diverter arm is in said first position.

21. A pallet conveyor, comprising:
a plurality of pallets each having an upper platform and one or more lower support surfaces;
a powered chain conveyor section that includes a pair of chains running along opposite sides of said conveyor section such that said pallets can be placed on said conveyor section with each pallet resting upon said pair of chains, said chain conveyor including at least one motor operatively connected to said chains to drive said chains along said conveyor section;
a corner assembly connected at an end of said conveyor section to receive said pallets as they exit said conveyor section, said corner assembly having at least one guide defining a curved path and a low friction gliding support for said pallets as they move through said corner assembly, wherein, upon transferring from said conveyor section to said corner assembly, support for each pallet is transferred from said chains to said gliding support with each pallet moving through said corner assembly on said gliding support along a path defined by said one or more guides; and
a corner injection unit located at a downstream end of the conveyor section adjacent the gliding support, said corner injection unit comprising a powered drive that engages at least one of said one or more lower support surfaces of said pallets independently of said pair of chains as said pallets exit said conveyor section and drives said pallets onto said gliding support.

22. A pallet conveyor as defined in claim 21, wherein said at least one guide comprises a fixed outer guide having a curved inner surface that steers said pallets through said corner assembly.

23. A pallet conveyor, comprising:
a plurality of pallets each having an upper platform and one or more lower support surfaces;
a powered chain conveyor section that includes a pair of chains running along opposite sides of said conveyor section such that said pallets can be placed on said conveyor section with each pallet resting upon said pair of chains, said chain conveyor including at least one motor operatively connected to said chains to drive said chains along said conveyor section;
a corner assembly connected at an end of said conveyor section to receive said pallets as they exit said conveyor section, said corner assembly having at least one guide defining a curved path and a low friction gliding support for said pallets as they move through said corner assembly, wherein, upon transferring from said conveyor section to said corner assembly, support for each pallet is transferred from said chains to said gliding support with each pallet moving through said corner assembly on said gliding support along a path defined by said one or more guides; and
a corner injection unit located at a downstream end of the conveyor section adjacent the gliding support, said corner injection unit comprising a powered drive that engages at least one of said one or more lower support surfaces of said pallets as they exit said conveyor section and drives said pallets onto said gliding support;
wherein said chain conveyor section comprises a first conveyor section, and wherein said pallet conveyor further comprises second and third conveyor sections, each of which are joined to the other conveyor sections by said corner assembly, wherein said at least one guide is movable between a first position in which the pallets move between a first pair of said conveyor sections and a second position in which the pallets move between a second pair of said conveyor sections.

24. A pallet conveyor as defined in claim 23, wherein said movable guide comprises a first diverter arm and wherein said corner assembly further comprises a second diverter arm movable between a first position and a second position, said first and second diverter arms each being movable between their respective first and second positions to control transference of the pallets between said conveyor sections, wherein each of said diverter arms includes a proximal end mounted for pivotal rotation of that diverter arm about an axis, and a distal, free end that pivots about said axis when moving between said first and second positions, and wherein at least one of said diverter arms includes a stop feature that engages the other diverter arm when moving between said first and second positions.

* * * * *